US009141511B2

(12) United States Patent  
Muske et al.

(10) Patent No.: US 9,141,511 B2  
(45) Date of Patent: Sep. 22, 2015

(54) METHOD AND SYSTEM FOR VERIFYING SLEEP WAKEUP PROTOCOL BY COMPUTING STATE TRANSITION PATHS

(71) Applicant: Tata Consultancy Services Limited, Mumbai (IN)

(72) Inventors: Tukaram B. Muske, Pune (IN); Advaita Datar, Pune (IN); Amey Anand Zare, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/336,171

(22) Filed: Jul. 21, 2014

(65) Prior Publication Data

US 2015/0052504 A1    Feb. 19, 2015

(30) Foreign Application Priority Data

Aug. 19, 2013    (IN) .......................... 2701/MUM/2013

(51) Int. Cl.  
G06F 11/36    (2006.01)

(52) U.S. Cl.  
CPC .................................. *G06F 11/3604* (2013.01)

(58) Field of Classification Search  
None  
See application file for complete search history.

(56) References Cited

U.S. PATENT DOCUMENTS

| | | | |
|---|---|---|---|
| 5,872,909 A * | 2/1999 | Wilner et al. ............... | 714/38.12 |
| 6,178,394 B1 | 1/2001 | Godefroid | |
| 6,446,213 B1 * | 9/2002 | Yamaki ......................... | 713/300 |
| 7,844,953 B2 * | 11/2010 | Morizawa et al. ............ | 717/126 |
| 2002/0066078 A1 * | 5/2002 | Ishii et al. ...................... | 717/126 |
| 2006/0075305 A1 * | 4/2006 | Robinson et al. ............... | 714/38 |
| 2009/0132991 A1 | 5/2009 | Ganai et al. | |
| 2010/0275186 A1 * | 10/2010 | McGarvey et al. ........... | 717/132 |
| 2011/0145799 A1 * | 6/2011 | Bartolomeo ................... | 717/132 |
| 2011/0154343 A1 * | 6/2011 | Michael et al. ............... | 718/102 |
| 2012/0254665 A1 * | 10/2012 | Pasala et al. .................... | 714/33 |
| 2012/0290261 A1 | 11/2012 | Genta | |
| 2014/0189652 A1 * | 7/2014 | Gounares ....................... | 717/125 |
| 2014/0208297 A1 * | 7/2014 | Chockler et al. .............. | 717/126 |

OTHER PUBLICATIONS

Jeremy Lau; Erez Perelman and Brad Calder of University of California, San Diego, "Selecting Software Phase Markers with Code Structure Analysis" International Symposium on Code Generation and Optimization (CGO 2006), pp. 1-12.

* cited by examiner

*Primary Examiner* — Chat Do  
*Assistant Examiner* — Douglas Slachta  
(74) *Attorney, Agent, or Firm* — Finnegan, Henderson, Farabow, Garrett & Dunner, LLP

(57) ABSTRACT

Disclosed are a method and a system for facilitating verification of program code implementing Sleep Wakeup protocol for a microcontroller. An input handling module is configured to receive metadata from user required for verification of the program code. Identification module is configured to identify abstract syntax tree (AST) nodes corresponding to each program point in the program code. A computation module is configured to compute an actual interrupt protection status (IPS), task lock status (TLS), path entities and shared variables for each program point in the program code. A path analysis module is configured to determine transition paths between program points specified in the metadata, and are computed in terms of the path entities. Also, review information is computed for each of the path entities comprised in the transition paths. Further, a report generation module is configured to generate a report comprising the review information facilitating the user to verify the program code.

17 Claims, 5 Drawing Sheets

METHOD AND SYSTEM FOR VERIFYING SLEEP WAKEUP PROTOCOL BY COMPUTING STATE TRANSITION PATHS

CROSS-REFERENCE TO RELATED PATENT APPLICATIONS

This U.S. patent application claims the benefit of priority under 35 U.S.C. §119 to India Patent Application No. 2701/MUM/2013, filed on Aug. 19, 2013. The aforementioned application is incorporated herein by reference in its entirety.

TECHNICAL FIELD

The present subject matter described herein, in general, relates to a method and a system for verifying Sleep Wakeup protocol implementation.

BACKGROUND

Power preservation is a critical issue in energy-constrained systems. In order to preserve the power in these energy-constrained systems, power saving protocols such as Sleep Wakeup protocol may be implemented. The implementation of the Sleep Wakeup protocol may enable automatic switching of a node connected in a network between a power-saving mode and power-consumption mode depending on the requirement of power by the node in order to execute designated tasks of communication in the network. The power-saving mode and the power-consumption mode may also be referred as a Sleep mode and a Wakeup mode respectively. The Sleep Wakeup protocol may switch a standalone node which is not connected in the network or a node connected in the network into the Sleep mode when the communication is not required or no task is available for execution by the node. Similarly, the Sleep Wakeup protocol may switch the standalone/network node from the Sleep mode to the Wakeup mode as soon as the communication is required or a task is available for execution by the node. Thus, by implementing the Sleep Wakeup protocol in the standalone node or the network node, the energy consumption is minimized.

In general, the Sleep Wakeup protocol may be implemented in a microcontroller installed at each of the sensor nodes in the network. The Sleep Wakeup protocol may be coded in a programming language and further implemented in a system through an application, wherein the application may be configured to execute the Sleep Wakeup Protocol. The implementation of the Sleep Wakeup protocol may require its verification in order to check whether state transitions of the protocol are conforming to the specifications of the microcontroller. For the system implementing the Sleep Wakeup protocol, it is very difficult to verify whether the state transitions (Sleep/Wakeup) are conforming to the specifications of the microcontroller. Such verification is required in order to detect if its implementation will not lead to unexpected behavior at run-time. Few examples of the unexpected behavior may be Battery Drain, and Watch Dog timer reset etc. In the existing state of art, this verification is done manually and is generally found to be time consuming, costly and sometimes error-prone. Therefore, an automated technique for this type of verification is required in the current state of the art that can detect the defects that may occur during the transition of the microcontroller from the Low Power Consumption (Sleep) to High Power Consumption (Wakeup) modes and vice versa.

SUMMARY

This summary is provided to introduce aspects related to systems and methods for facilitating verification of a Sleep Wakeup protocol and the concepts are further described below in the detailed description. This summary is not intended to identify essential features of the claimed subject matter nor is it intended for use in determining or limiting the scope of the claimed subject matter.

In one implementation, a system for facilitating verification of a program code implementing a Sleep Wakeup protocol for a microcontroller is disclosed. The system comprises a processor and a memory coupled to the processor for executing a set of modules stored in the memory. The set of modules comprises an input handling module, an identification module, a computation module, a path analysis module and a report generation module. The input handling module is configured to receive metadata from a user. The metadata is required for verification of the program code. The metadata comprises a location of a plurality of program points in the program code, each program point of the plurality of program points corresponding to at least one of a start of a Background job, a Sleep operation, and a Wakeup operation in the program code. Further, the metadata comprises an initial interrupt protection status (IPS) at the start of the program code, interrupt functions for at least one of enabling and disabling the interrupts, and task functions for at least one of enabling and disabling task switching. The computation module, for each program point of the plurality of program points is configured to compute an actual interrupt protection status (IPS) based on the initial interrupt protection status (IPS) and calls to the interrupt functions. Further, the computation module is configured to compute a task lock status (TLS) based on calls of the task functions. Also, the computation module is configured to compute an actual IPS based on the initial IPS and calls to the interrupt functions, a task lock status (TLS) based on calls of the task functions, path entities comprising at least one of a conditional statement and a function call point, and shared variables. The path analysis module is configured to determine transition paths between the plurality of program points in terms of the path entities, and compute review information for each set of path entities based on the actual IPS, the TLS, and the shared variables. Thereafter, the variables; and report generation module configured to generate a report for the user in a pre-defined format, wherein the report comprises information relating to the transition paths and the review information, and wherein the report facilitates the user to verify the program code.

In another implementation, a method performed by at least one processor for facilitating verification of a program code implementing a Sleep Wakeup protocol for a microcontroller is disclosed. The method may include receiving metadata from a user. The metadata may be required for verification of the program code. The metadata may include a location of a plurality of program points in the program code, each program point of the plurality of program points corresponding to at least one of a start of a Background job, a Sleep operation, and a Wakeup operation in the program code. The metadata may also include an initial interrupt protection status (IPS) at the start of the program code, interrupt functions for at least one of enabling and disabling the interrupts, and task functions for at least one of enabling and disabling task switching. Further, the method may include computing for each program point an actual IPS based on the initial IPS and calls to the interrupt functions, a task lock status (TLS) based on calls to the task functions, path entities comprising at least one of a conditional statement and a function call point, and shared variables. The method may also include determining transition paths between the plurality of program points in terms of the path entities, computing review information for each set of path entities based on the actual IPS, the TLS, and the shared variables, and generating a report for the user in a pre-defined format, wherein the report comprises information relating to the transition paths and the review information, and wherein the report facilitates the user to verify the program code.

In yet another implementation, non-transitory computer readable medium storing machine readable instructions executable by one or more processors is disclosed. The instructions may be executable by the one or more processors for receiving metadata from a user, wherein the metadata is required for verification of the program code. The metadata may include a location of a plurality of program points in the program code, each program point of the plurality of program points corresponding to at least one of a start of a Background job, a Sleep operation, and a Wakeup operation in the program code. The metadata may also include an initial interrupt protection status (IPS) at the start of the program code, interrupt functions for at least one of enabling and disabling the interrupts, and task functions for at least one of enabling and disabling task switching. Additionally, the instructions may be executable by the one or more processors for computing for each program point of the plurality of program points an actual IPS based on the initial IPS and calls to the interrupt functions, a task lock status (TLS) based on calls to the task functions, path entities comprising at least one of a conditional statement and a function call point, and shared variables. Further, the instructions may be executable by the one or more processors for determining transition paths between the plurality of program points in terms of the path entities, computing review information for each set of path entities based on the actual IPS, the TLS, and the shared variables, and generating a report for the user in a pre-defined format, wherein the report comprises information relating to the transition paths and the review information, and wherein the report facilitates the user to verify the program code.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
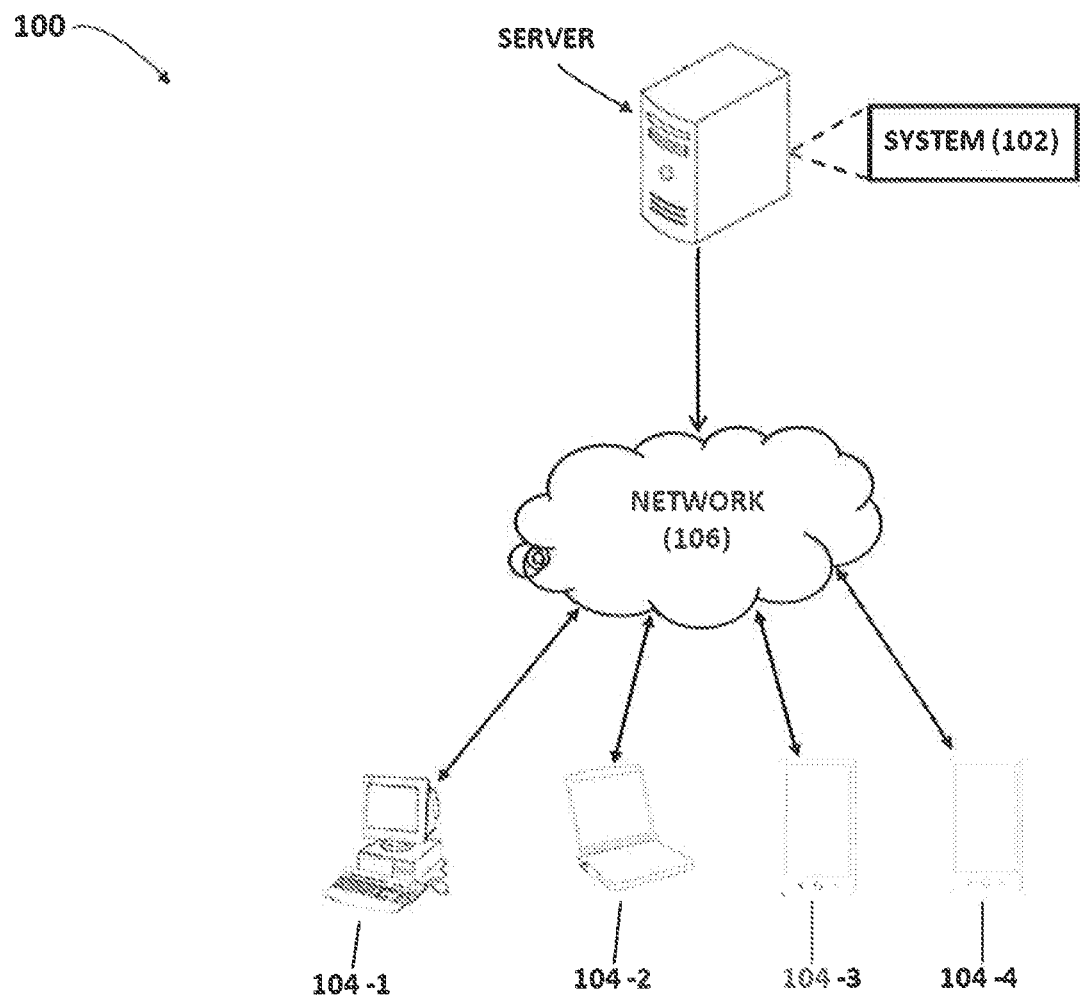
FIG. 1 illustrates a network implementation of a system for facilitating verification of a program code implementing a Sleep Wakeup protocol, in accordance with an embodiment of the present subject matter.

Systems and methods for facilitating verification of a program code implementing a Sleep Wakeup protocol for a microcontroller have been disclosed. The program code may implement the Sleep Wakeup protocol that may enable the microcontroller to switch back and forth between Sleep and Wakeup states. The Sleep state may also be referred as low power consumption state and the Wakeup state may also be referred as high power consumption state. The transitions between the Sleep and the Wakeup state may occur when the certain guarding conditions are met as well as an Interrupt Protection Status (IPS) at implementation of the program code matches with the microcontroller's specification. Any deviation in expectation of the guarding conditions or in the IPS may lead to an unexpected behavior at a runtime of the program code. Thus, in order to prevent such behavior verification of the program code may be required.

For achieving the verification, "state transition paths" hereinafter referred as "transition paths" is determined that may enable to switch the microcontroller back and forth between the Sleep mode and the Wakeup mode. In order to determine the transition paths in the program code implementing the Sleep Wakeup protocol, a metadata may be received by the system as an input from a user. The metadata may comprise information such as location of a plurality of program point, wherein each program point corresponds to different operation of the Sleep Wakeup protocol like start of background job, Sleep operation and Wakeup operation. The metadata may further comprise an initial interrupt protection status (IPS), a type of high power activation mode implemented in the microcontroller, an expected interrupt protection status (IPS) of a Sleep operation, interrupt functions for enabling or disabling the interrupts, and task functions for enabling or disabling task switching.

Also, the given program code may be processed for identifying an abstract syntax tree (AST). The AST comprises a first set of AST nodes for the program code, and based on the first set of AST nodes and the metadata received from the user, a second set of AST nodes corresponding to the program points specified by the metadata are identified. Thus, after receiving the metadata from the user and identification of the AST and second set of AST nodes, the system may compute an actual IPS a task lock status (TLS) and shared variables for every program point statement. Further, it may compute path entities comprising of conditional statements or function call points. After computing this information, transition paths between each of the pairs of the program points specified in the metadata may be determined in terms of the previously computed path entities. Determination of the transition paths between a pair of the program points includes computing all possible transition paths between the locations of two program points. This transition paths computation includes identifying, the transition paths between the program point which corresponds to the start of the background job and the program point which corresponds to the Sleep operation, identifying the transition paths between the program point which corresponds to the Sleep operation and the program point which corresponds to the Wakeup operation, and identifying the transition paths between the program point which corresponds to the Wakeup operation and the program point which corresponds to the start of the background job. After identifying the possible transition paths, the system may be enabled for computing review useful information, also referred as "review information". The review information may be computed on the basis of the actual IPS, the task lock status, and the shared variables. Thus, a report may be generated in a pre-defined format, wherein the report comprises information related to the transition paths determined in terms of the path entities and the review information computed for each of the path entities. Thus, based on the content/information generated in the report the user may be able to verify the program code implementing the Sleep Wakeup protocol for the microcontroller.

While aspects of described system and method for facilitating verification of a program code implementing a Sleep Wakeup protocol for a microcontroller may be implemented in any number of different computing systems, environments, and/or configurations, the embodiments are described in the context of the following exemplary system.

Referring now to FIG. 1, a network implementation 100 of system 102 for facilitating verification of program code is illustrated, in accordance with an embodiment of the present subject matter. In one embodiment, the system 102 is facilitated for verifying the program code 302 implementing Sleep Wakeup protocol for a microcontroller.

Although the present subject matter is explained considering that the system 102 is implemented for facilitating verification of the program code implementing the Sleep Wakeup protocol on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
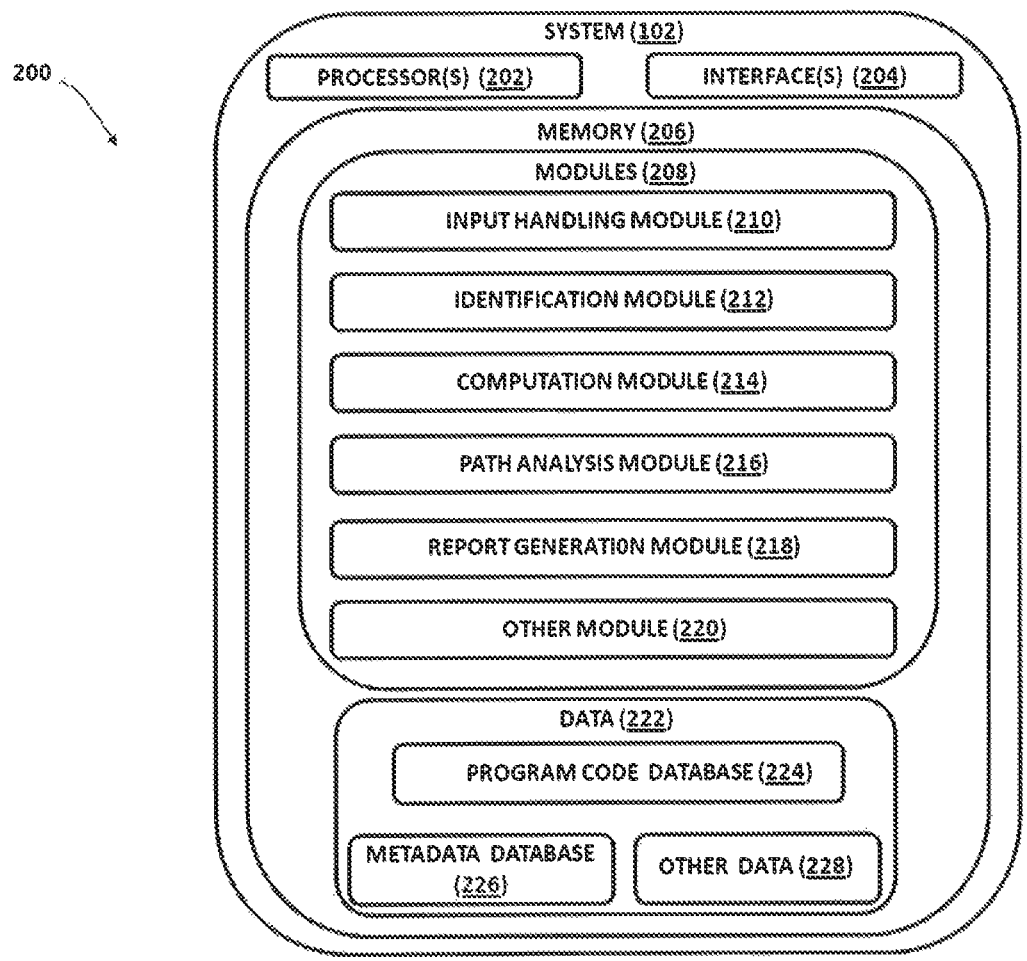
FIG. 2 illustrates a system for facilitating verification of a program code implementing a Sleep Wakeup protocol, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222.

The modules 208 include routines, programs, objects, components, data structures, etc., which perform particular tasks or implement particular abstract data types. In one implementation, the modules 208 may include an input handling module 210, an identification module 212, a computation module 214, a path analysis module 216, a report generation module 218 and other modules 220. The other modules 220 may include programs or coded instructions that supplement applications and functions of the system 102

The data 222, amongst other things, serves as a repository for storing data processed, received, and generated by one or more of the modules 208. The data 222 may also include program code database 224, metadata database 226, and other data 228 stored in database (not shown in the figure) of the memory 206.

In one implementation, at first, the user may use the client device 104 to access the system 102 via the I/O interface 204. The users may register them using the I/O interface 204 in order to use the system 102. The working of the system 102 is explained below in detail in FIG. 3. The system 102 may be used for facilitating the verification of the program code implementing the Sleep Wakeup protocol.

Figure 3:
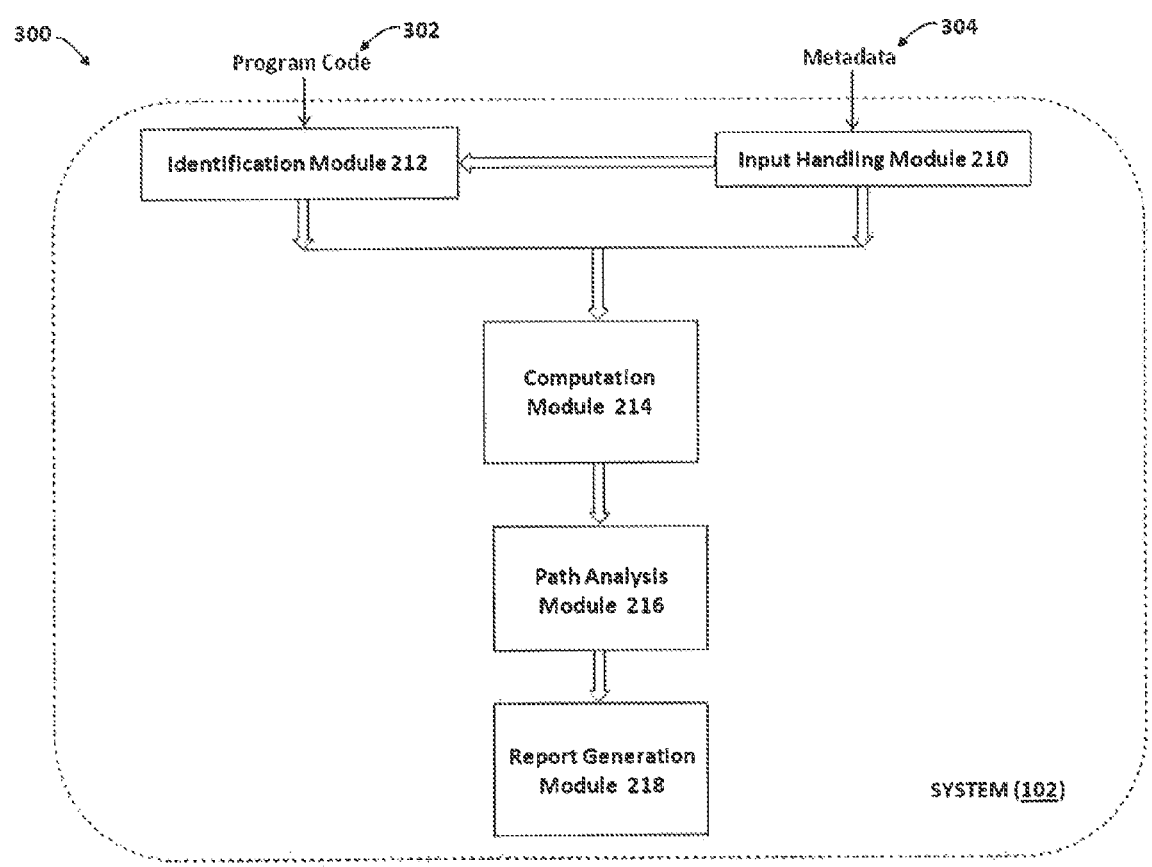
FIG. 3 illustrates a detailed working of a system for facilitating verification of a program code implementing a Sleep Wakeup protocol, in accordance with an embodiment of the present subject matter.

Referring to FIG. 3, a detailed working of the system 102 is illustrated, in accordance with an embodiment of the present subject matter. The purpose of the present subject matter is to enable the system 102 to facilitate verification of program code implementing Sleep Wakeup protocol for a microcontroller.

In an embodiment, the input handling module 210 may be configured to receive and validate metadata 304 from a user, wherein the metadata is required for verification of the program code 302. The metadata 304 may comprise location of a plurality of program points in the program code. Each program point of the plurality of program points may correspond to at least one of a start of a background job, a Sleep operation, and a Wakeup operation in the program code 302 for the microcontroller. According to embodiments of the present subject matter, the location of the plurality of program points may be received in a predefined format such as "Complete_Source_File_Name#Line_Number". It should be noted to a person skilled in art that the location may also be received any other format. Further, the metadata 304 may also comprise an initial interrupt protection status (initial IPS) at the start of the program code 302, type of the high power activation mode implemented in the microcontroller, expected interrupt protection status of the Sleep operation, interrupt functions which may be capable of enabling or disabling the interrupts, and task functions which may be capable for enabling or disabling task switching.

Further, one of a content of the metadata 304 i.e., the type of the high power activation mode may be only required when the Wakeup mode/operation of the microcontroller is activated by external signals. For example, where the microcontroller supports the reduction of power consumption by changing the speed of the microcontroller operation (clock) or by self controlled Wakeup, such metadata i.e., the type of the high power activation mode may not be required for the verification of the program code 302. In an embodiment, after introducing the program code 302 into the system 102 and receiving the metadata 304 by the user, the identification module 212 may be configured to identify abstract syntax tree (AST) corresponding to the program code 302. The AST comprises a first set of AST nodes for the program code, and based on the first set of AST nodes and the metadata received from the user, a second set of AST nodes corresponding to the program points specified by the metadata are identified. Further, according to embodiments of the present subject matter, compilation techniques such as lexical analysis, parsing and the like may be performed in order to process the program code 302 for generating the abstract syntax tree.

Thus, after receiving the metadata 304 and identifying the abstract syntax tree, the computation module 214, for each program point may be configured to compute: an actual interrupt protection status (actual IPS) based on the initial IPS and the interrupt functions, wherein the initial IPS may be provided by the user as a part of the metadata 304 during the start of an application implementing the Sleep Wakeup protocol for the microcontroller.

Further, yet another part of the metadata 304 i.e., the expected interrupt protection status (expected IPS) of the Sleep operation may be required to determine safe or unsafe behavior of the transition paths computed. Here the system 102 may match the expected IPS input by the user with the actual IPS computed at the Sleep operation in the implementation of the program code 302. If any deviation is found while matching the expected IPS and the actual IPS, it may be presented to the user in order to be reviewed.

Also, the interrupt functions for enabling or disabling the interrupts may be required as a part of the metadata 304 from the user to support the computation module 214 in determining the actual IPS for each program point of the plurality of program points in the program code 302 based on the initial IPS and call to the interrupt functions. The interrupt functions for enabling or disabling the interrupts may be required to be input by the user as it may vary from one implementation to another implementation of the program code 302. In an embodiment of the present subject matter, the computation module 214 may also utilize a data flow analysis for computing the actual IPS for the each program point in the program code 302. The actual IPS may be computed as Protected (P) state, Unprotected (U) state or Protected/Unprotected (P/U) state. The Protected/Unprotected (P/U) state is computed when there may exist at least two transition paths which can execute a program point in a protected as well as unprotected interrupts state.

In an embodiment, the computation module 214 may also be configured to compute a task lock status (TLS) for each program point in the program code 302 based on call to the task functions, wherein the task functions may be capable of enabling or disabling task switching. Further, the computation module 214 may also utilize a data flow analysis for identifying the TLS for the each program point in the program code 302. The TLS may be computed as a Locked (L) state, Unlocked (U) state or Locked/Unlocked (L/U) state. The TLS identified as Locked/Unlocked (L/U) when there exists at least two transition paths that may execute a program point in a Locked as well as Unlocked state.

Further, the computation module 214 may be configured to compute path entities for each program point of the plurality of program points. The path entities comprise at least one of conditional statements and function call points. Also, the computation module 214 may also be configured to compute shared variables for each program point used in the application implementing the Sleep Wakeup protocol through the program code 302. The computation module 214 may also compute a list of interrupt service routines (ISR routines) and other tasks running in parallel in order to compute the shared variables.

In an embodiment of the present subject matter, after computing the actual IPS, the TLS, the path entities and the shared variables by the computing module 214, the path analysis module 216 may be configured to determine the transition paths between each of the pairs of the program points specified in the metadata, and are computed in terms of the path entities by the computation module 214. Here, all the possible transition paths are determined between a pair of locations of the program points input by the user as the metadata 304. In an embodiment of the present subject matter, the transition paths may be determined between the program point which corresponds to the start of the background job and the program point which corresponds to the Sleep operation, the transition paths may be determined between the program point which corresponds to the Sleep operation and the program point which corresponds to the Wakeup operation, and similarly the transition paths may be determined between the program point which corresponds to the Wakeup operation and the program point which corresponds to the start of the background job. Thus, after determination of the possible transitions paths, the path analysis module 216 may also be configured to compute review information for each path entity comprised in transition paths, based on the previously computed actual IPS, the task lock status and the shared variables.

In an embodiment, after determination of the transition paths, the report generation module 218 may be configured to generate a report for the user in a pre-defined format, wherein the report comprises information related to the transition paths determined and the review information computed in order to be reviewed by the user. Thus, the report generated may facilitate the user to verify the program code 302. According to the embodiments of the present subject matter, the information related to the transition path determined and the review information may also be presented in a tabular format. The information related to the transition paths presented in the tabular format further comprises: (a) program statement of the path entity selected from the program code 302, (b) location of the path entity in the program code 302, wherein the location of a path entity comprises of the name of the input file and the line number in the program code 302, (c) type of the path entity i.e. whether the path entity is a controlling statement or a function call point, (d) the actual IPS computed at the program statement of the path entity.

Along with the information related to the transition paths, the review information may also be presented in the tabular format, and wherein the review information comprise the followings: (a) review judgment of the IPS at a Sleep operation, wherein the review judgment is evaluated by comparing the user's expected IPS value at Sleep operation with the actual IPS value at the Sleep operation, (b) the task lock status (TLS) computed at the program statement of the path entity, (c) review judgment pertaining to risk of shared variables being overwritten by Interrupt service routine (ISR), (d) the shared variables and the ISRs overwriting these shared variables pertaining to review judgment of risk of shared variables overwrite by ISR, (e) review judgment pertaining to risk of shared variables being overwritten by parallel tasks, and (f) the shared variables and the parallel tasks which may overwrite these shared variables pertaining to review judgment of risk of shared variables overwrite by parallel tasks. Thus, the review information provides the details which may be reviewed by the user to verify the program code 302 implementing the Sleep Wakeup protocol for the microcontroller.

Figure 4:
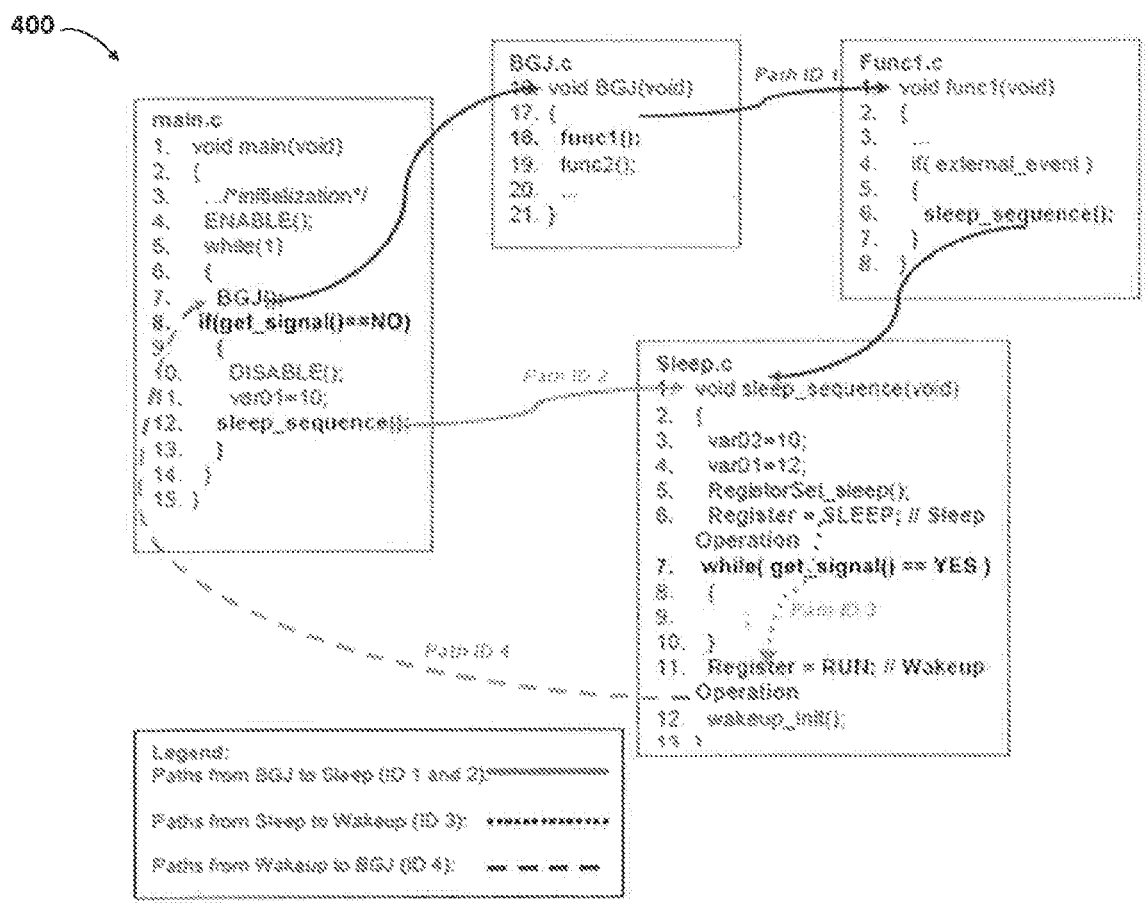
FIG. 4 illustrates a Sleep Wakeup protocol implementation through a program code according to exemplary embodiment of the present subject matter.

Referring now to FIG. 4, a Sleep Wakeup protocol implementation through a program code according to exemplary embodiment of the present subject matter is shown. The system 102 may receive the program code 302 and the metadata 304 from a user. According the exemplary embodiment of the present subject matter, set of instructions shown in FIG. 4 may be considered as the program code 302. After receiving the program code 302 and the metadata 304, abstract syntax tree (AST) corresponding to the program code 302 may be generated. The AST comprises of first set of AST nodes for the program code 302, and based on the first set of AST nodes and the metadata 304 received from the user, a second set of AST nodes corresponding to the program points specified by the metadata are identified.

Also, based on the contents of the metadata 304, an actual IPS, TLS, path entities and shared variables for each program point of the plurality of program points may be computed.

After identifying the above details, transition paths between a pair of program points may be determined in terms of the path entities. From the program code shown in FIG. 4, the location of the program points may be given as:
1. Location of the program points for start of the background job: C:\sources\main.c#7
2. Location of the program points for putting the microcontroller into a Sleep mode/operation: C:\sources\Sleep.c#6 and
3. Location of the program points for putting the microcontroller into a Wakeup mode/operation: C:\sources\Sleep.c#11

In an embodiment of the present subject matter, from the program code shown in FIG. 4, the interrupt functions that can enable or disable the interrupts and comprised in the metadata, may comprise:
 a. ENABLE ( )—function enabling the interrupts
 b. DISABLE ( )—function disabling the interrupts According to embodiments of the present subject matter, from the program code shown in FIG. 4, the functions that enable or disable the task switching, and the tasks running in parallel with main task, are not shown.

From the above given program points, the path analysis module 216 may be configured to determine all possible transition paths between each of the pairs of the program points specified in the metadata, and are computed in terms of the path entities after processing the AST identified. According to the given program code of FIG. 4, and the location of plurality of the each program point, the following transition paths may be identified and displayed in Table 1 shown below:
1. Transition paths from the start of the background job to the Sleep mode/operation: —Paths with ID 1 and ID 2
2. Transition path from the Sleep mode/operation to the Wakeup mode/operation: —Path with ID 3
3. Transition path from the Wakeup mode/operation to the start of the background job: —Path with ID 4

After determining the transition paths in the program code as shown in FIG. 4, the path analysis module 216 may also be configured for computing review information. According to the exemplary embodiment of the present subject matter, the review information may be presented in the Table 1 as shown below. Each column/field in this table may be furnished with the review information which may be reviewed by the user for verification of the program code. In the given Table 1, the following information may be furnished:
1. The path IDs given to the transition paths in the Path ID column is a unique ID.
2. The program statement given at each program point of a path entity may be a conditional statement or function call statement as it appears in the program code 302.
3. The "location" column indicates the location of the program point of a path entity in the program code 302. The location may be represented in a format like "Absolute_File_Path::Line_Number", where the Absolute_File_Path is the path of the file name at which the program point is present and the Line_Number is line number in the mentioned file name where the program point is present.
4. The column "statement type" identifies whether the program point is the conditional statement or not. In case the program point is a conditional statement, its value will be "C".
5. The column "IPS" will show the actual IPS computed for the program point of a path entity in the program code 302. The values in the column may be P, U or P/U, where
 P: Protected when the interrupts are always observed to be "Disabled"
 U: Unprotected when the interrupts are always observed to be "Enabled"
 P/U: Protected/Unprotected when the interrupts are observed to be "Enabled" as well as "Disabled".
6. The column "Review judgment of IPS of Sleep operation" is used for those paths which end with Sleep operation. The values in this particular column can be seen in detail as per Table 2 shown below. In this table, the review judgment of the IPS of Sleep operation is determined by comparing the expected IPS of the Sleep operation input by the user with the actual IPS of the Sleep operation, wherein the actual IPS is computed from the program code. When the match is observed, the value for this column is "OK" which exemplify that there is no need to review the actual IPS and its corresponding transition path is safe and will not create any problem during the execution of the program code 302. When there is a mismatch/deviation in the actual IPS, the value will be "TBR" i.e., To Be Reviewed or "Unsafe". This value suggests the user to review the actual IPS, since the transition path can be unsafe and may lead to an unexpected behavior during the execution of the program code 302.
7. The column "Risk of shared overwrite by ISRs" provides a judgment if the variables accessed on a path entity have a possibility of being overwritten by any interrupt service routine (ISR). This column will have value "TBR" when any of the variables from the program statement of the path entity includes variables which are written in any other ISR and the value of the actual IPS at the program point of the path entity is computed as "U" or "P/U".
8. The next column is "Shared variables overwritten by ISR" which will provide a pair(s) comprising of shared variable and the ISR(s) in which the shared variable is overwritten. The information in this column may be presented in a following format:
 "[shvy01: INT01, INT02]", [shvy01:INT01], where
 "shvy01" is the shared variable getting overwritten by the ISRs "INT01" and "INT02".
 "shvy01" is the shared variable getting overwritten by the ISR "INT01"
 The value in this column will be provided only when the value of the column "Risk of shared overwrite by ISRs" is "TBR".
9. The column "TLS" represents the task lock status for the program point of a path entity in the program code 302 and the values under this column may be "L", "U" or "L/U", where, "L": Locked when task switching is always observed to be "Disabled"

"U": Unlocked when the task switching is always observed to be "Enabled"

"L/U": Locked/Unlocked when the task switching is observed to be "Enabled" as well as "Disabled".

10. The column "Risk of shared overwrite by parallel tasks" will provide a judgment if the value of the variables accessed on path entities have a possibility of being overwritten by any other parallel running task. The value in this column will be "TBR" when any of the variables from the program statement i.e., the program point of a path entity includes variables which are written in some other parallel running task and the TLS for the program point is observed to be "U" or "L/U".

11. The next column of the Table 1 is "Shared variables overwritten by parallel tasks" which will provide pair(s) comprising of shared variable and the parallel task(s) in which the shared variable is overwritten. The information in this column may be presented in a following format:

"[shv01: task01, task02]", "[shv02:task01]", where

"shv01" is a shared variable getting overwritten by the tasks "task01" and "task02".

"shv02" is a shared variable getting overwritten by the task "task01".

Further, the values in this column will be provided only when the value of the column "Risk of shared overwrite by parallel tasks" is "TBR".

may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

At block 502, a metadata 304 may be received from a user and validated, to verify the program code 302 implementing the Sleep Wakeup protocol for a microcontroller. The metadata 304 may comprise location of a plurality of program points in the program code 302, wherein each program point

TABLE 1

Review information generated in a tabular format to be reviewed by user.

| Path ID | Program Statement | Location | Statement Type | IPS | Review Judgement of IPS of Sleep Operation | Risk of Shared Overwrite by ISRs | Shared Variables Overwritten by ISRs | TLS | Risk of Shared Overwrite by Parallel Tasks | Shared Variables Overwritten by Parallel Tasks |
|---|---|---|---|---|---|---|---|---|---|---|
| 1 | BGJ( ) | main.c::7 |  | U |  |  |  | U |  |  |
|  | func1( ): | BGJ.c::18 |  | U |  |  |  | U |  |  |
|  | if( external_event) | Func1.c::4 | C | U |  |  |  | U |  |  |
|  | sleep_sequence( ) | Func1.c::6 |  | U |  |  |  | U |  |  |
|  | Register = SLEEP; | Sleep.c::6 |  | U | NG | OK |  | U | OK |  |
| 2 | BGJ( ) | main.c::7 |  | U |  |  |  | U |  |  |
|  | f(get_signal( )==NO) | main.c::8 | C | U |  |  |  | U |  |  |
|  | sleep_sequence( ) | main.c::12 |  | P |  |  |  | U |  |  |
|  | Register = SLEEP; | Sleep.c::6 |  | P | OK | OK |  | U | OK |  |
| 3 | Register = SLEEP; | Sleep.c::6 |  | P/U |  | OK |  | U | OK |  |
|  | !while(get_signal( )==YES) | Sleep.c::7 | C | P/U |  | OK |  | U | OK |  |
|  | Register = RUN; | Sleep.c::11 |  | P/U |  | OK |  | U | OK |  |
| 4 | Register = RUN; | Sleep.C::11 |  | P/U |  | OK |  | U | OK |  |
|  | BGJ( ) | main.c::7 |  | P/U |  |  |  | U |  |  |

TABLE 2

Review judgment determination for the IPS of Sleep operation.

| User's expected IPS of Sleep Operation | Actual/Computed IPS of Sleep Operation | Review Judgment of IPS of Sleep Operation |
|---|---|---|
| Protected (P) | P | OK |
|  | U | Unsafe |
|  | P/U | TBR |
| Unprotected (U) | P | Unsafe |
|  | U | OK |
|  | P/U | TBR |

Figure 5:
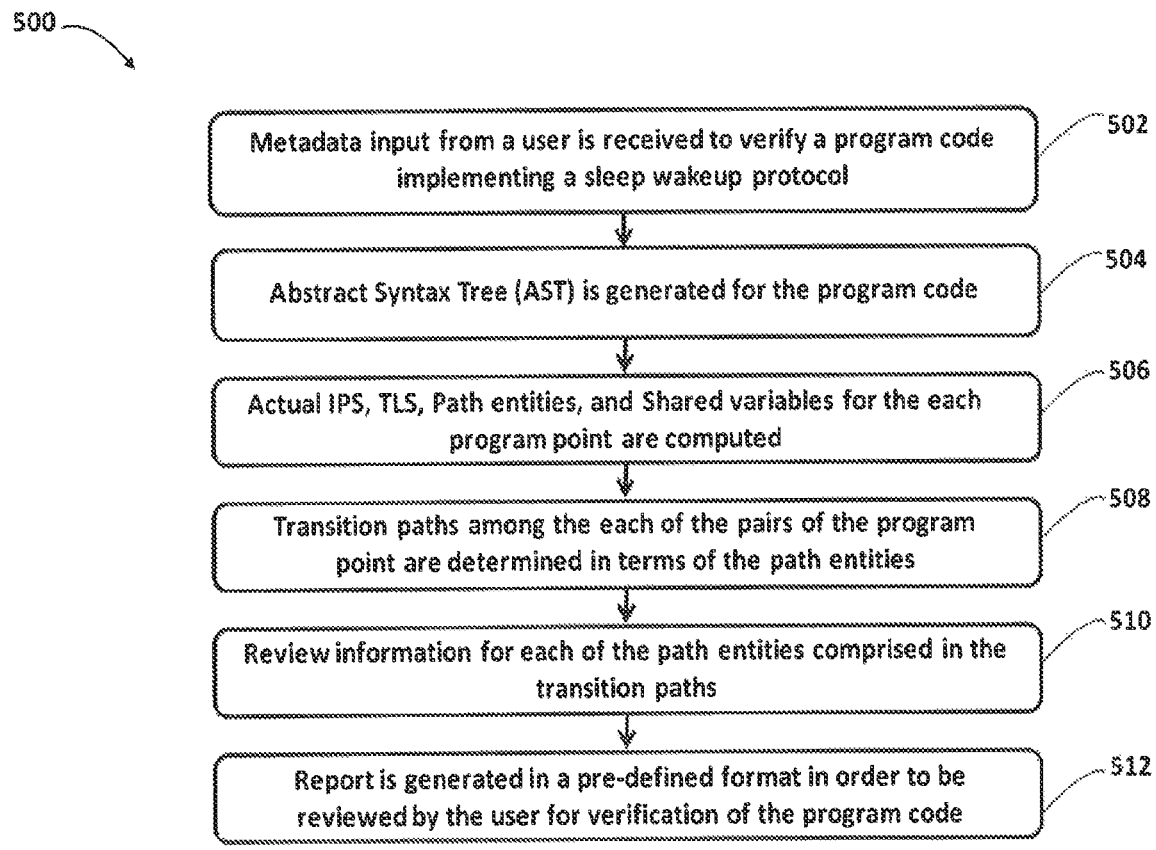
FIG. 5 illustrates a method for facilitating verification of a program code implementing a Sleep Wakeup protocol, in accordance with an embodiment of the present subject matter.

Referring now to FIG. 5, a method 500 for facilitating verification of a program code implementing a Sleep Wakeup protocol for a microcontroller is shown, in accordance with an embodiment of the present subject matter. The method 500 corresponds to at least one of a start of a background job, a Sleep mode/operation, and a Wakeup mode/operation for the microcontroller.

At block 504, abstract syntax tree (AST) is generated for the program code 302. AST comprises a first set of AST nodes for the program code 302. Based on the first set of AST nodes and the received metadata 304, a second set of AST nodes corresponding to the program points specified by the metadata are identified.

At block 506, an actual IPS, task lock status (TLS), path entities and shared variables for each of the points in the program code 302 may be computed.

At block 508, transition paths between each of the pairs of the program points may be determined in terms of the path entities which are computed at block 506.

At block 510, review information for each of the path entities comprised in the transition paths may be computed based on the actual IPS, the TLS and the shared variables which are computed for the each program point.

At block 512, a report may be generated in a pre-defined format in order to be reviewed by the user for verification of the program code 302 implementing the Sleep Wakeup protocol for the microcontroller.

ADVANTAGES

The system 102 enables automated verification to check whether state transitions of Sleep Wakeup protocol are conforming to microcontroller's specification.

The system 102 helps in preventing any unexpected behavior during the runtime of the program code implementing the Sleep Wakeup protocol by providing the early stage verification.

The system 102 provides review information in form of a report to the user, wherein the review information comprises pin point identification of any defects/inconsistencies in the program code implementing the Sleep Wakeup protocol which may lead to any unexpected behavior during its runtime.

Although implementations for methods and systems are for facilitating verification of the program code implementing Sleep Wakeup protocol in the microcontroller specification, it is to be understood that the appended claims are not necessarily limited to the specific features or methods described. Rather, the specific features and methods are disclosed as examples of implementations for verification of the program code.

What is claimed is:

1. A method for facilitating verification of a program code implementing a Sleep Wakeup protocol for a micro-controller, the method performed by at least one processor and comprising:
    receiving metadata from a user, wherein the metadata is required for verification of the program code, and wherein the metadata comprises:
        a location of a plurality of program points in the program code, each program point of the plurality of program points corresponding to at least one of a start of a Background job, a Sleep operation, and a Wakeup operation in the program code;
        an initial interrupt protection status (IPS) at the start of the program code;
        interrupt functions for at least one of enabling and disabling the interrupts; and
        task functions for at least one of enabling and disabling task switching;
    computing for each program point:
        an actual IPS based on the initial IPS and calls to the interrupt functions;
        a task lock status (TLS) based on calls to the task functions;
        path entities comprising at least one of a conditional statement and a function call point; and
        shared variables;
    determining transition paths between the plurality of program points in terms of the path entities;
    computing review information for each set of path entities based on the actual IPS, the TLS, and the shared variables; and
    generating a report for the user in a pre-defined format, wherein the report comprises information relating to the transition paths and the review information, and wherein the report facilitates the user to verify the program code.

2. The method of claim 1, wherein the metadata further comprises:
    a type of high power activation mode implemented in the micro-controller, wherein the type of high power activation mode is required when the Wakeup mode is called by an external signal; and
    an expected IPS of the Sleep operation.

3. The method of claim 1, wherein the program code is processed to generate:
    an abstract syntax tree (AST) comprising a first set of AST nodes for the program code; and
    based on the first set of AST nodes and the metadata, a second set of AST nodes corresponding to the program points.

4. The method of claim 1, wherein:
    determining the transition paths comprises identifying all possible transition paths between a pair of program points; and
    the possible transition paths further comprise:
        transition paths that originate at the start of the Background job and end at a Sleep operation
        transition paths that originate at the Sleep operation and end at the Wakeup operation; and
        transition paths that originate at the Wakeup operation and end at the start of the Background job.

5. The method of claim 1, wherein the information related to a path entity on transition paths comprises:
    a program statement of the path entity;
    a location of the path entity in the program code, wherein the location of a path entity comprises a name of an input file and a line number in the program code;
    a type of path entity, wherein the type of the path entity may be at least one of a conditional statement or a function call point;
    an actual IPS computed at the program statement of the path entity.

6. The method of claim 1, wherein the review information comprises:
    a review judgment of IPS at the Sleep operation, wherein the review judgment is evaluated by comparing the user's expected IPS value at the Sleep operation and the actual IPS value for each set of program points;
    the TLS computed at the program statement of the path entity;
    a review judgment pertaining to risk of shared variables being overwritten by Interrupt service routines (ISRs);
    the shared variables and the ISRs;
    review judgment pertaining to risk of shared variables being overwritten by parallel tasks; and
    the shared variables and the parallel tasks.

7. A system for facilitating verification of a program code implementing a Sleep Wakeup protocol for a micro-controller, the system comprising:
    a processor; and
    a memory coupled to the processor, the memory comprising a plurality of modules capable of being executed by the processor, wherein the plurality of modules comprises:
        an input handling module configured to receive metadata from a user, wherein the metadata is required for verification of the program code, and wherein the metadata comprises:
            a location of a plurality of program points in the program code, each program point of the plurality of program points corresponding to at least one of a start of a Background job, a Sleep operation, and a Wakeup operation in the program code;

an initial interrupt protection status (IPS) at the start of the program code;
interrupt functions for at least one of enabling and disabling the interrupts; and
task functions for at least one of enabling and disabling task switching;
a computation module, for each program point of the plurality of program points, configured to compute:
an actual IPS based on the initial IPS and calls to the interrupt functions;
a task lock status (TLS) based on calls of the task functions;
path entities comprising at least one of a conditional statement and a function call point; and
shared variables;
path analysis module configured to:
determine transition paths between the plurality of program points in terms of the path entities; and
compute review information for each set of path entities based on the actual IPS, the TLS, and the shared variables; and
report generation module configured to generate a report for the user in a pre-defined format, wherein the report comprises information relating to the transition paths and the review information, and wherein the report facilitates the user to verify the program code.

8. The system of claim 7, wherein the metadata further comprises:
a type of high power activation mode implemented in the micro-controller, wherein the type of high power activation mode is required when the Wakeup mode is called by an external signal; and
an expected IPS of the Sleep operation.

9. The system of claim 7, wherein the plurality of modules includes an identification module configured to identify:
an abstract syntax tree (AST) comprising a first set of AST nodes for the program code, wherein the AST is generated by processing the program code; and
based on the first set of the AST nodes and the metadata, a second set of AST nodes corresponding to the program points are identified.

10. The system of claim 7, wherein the information relating to a path entity relating to a transition path comprises:
a program statement of the path entity;
a location of the path entity in the program code, the location of a path entity comprising a name of an input file and a line number in the program code;
a type of path entity, wherein the type of the path entity is at least one of a conditional statement or a function call point;
an actual IPS computed at the program statement of the path entity.

11. The system of claim 7, wherein the review information comprises:
a review judgment of IPS at the Sleep operation, wherein the review judgment is evaluated by comparing the user's expected IPS value at the Sleep operation and the actual IPS value for each set of program points;
the TLS computed at the program statement of the path entity;
a review judgment pertaining to risk of shared variables being overwritten by Interrupt service routines (ISRs); the shared variables and the ISRs;
review judgment pertaining to risk of shared variables being overwritten by parallel tasks; and
the shared variables and the parallel tasks.

12. A non-transitory computer readable medium storing machine readable instructions executable by one or more processors for:
receiving metadata from a user, wherein the metadata is required for verification of the program code, and wherein the metadata comprises:
a location of a plurality of program points in the program code, each program point of the plurality of program points corresponding to at least one of a start of a Background job, a Sleep operation, and a Wakeup operation in the program code;
an initial interrupt protection status (IPS) at the start of the program code;
interrupt functions for at least one of enabling and disabling the interrupts; and
task functions for at least one of enabling and disabling task switching;
computing for each program point:
an actual IPS based on the initial IPS and calls to the interrupt functions;
a task lock status (TLS) based on calls to the task functions;
path entities comprising at least one of a conditional statement and a function call point; and
shared variables;
determining transition paths between the plurality of program points in terms of the path entities;
computing review information for each set of path entities based on the actual IPS, the TLS, and the shared variables; and
generating a report for the user in a pre-defined format, wherein the report comprises information relating to the transition paths and the review information, and wherein the report facilitates the user to verify the program code.

13. The computer readable medium of claim 12, wherein the metadata further comprises:
a type of high power activation mode implemented in the micro-controller, wherein the type of high power activation mode is required when the Wakeup mode is called by an external signal; and
an expected IPS of the Sleep operation.

14. The computer readable medium of claim 12, wherein the one or more processors executes the instructions to process the program code to generate:
an abstract syntax tree (AST) comprising a first set of AST nodes for the program code; and
based on the first set of AST nodes and the metadata, a second set of AST nodes corresponding to the program points.

15. The computer readable medium of claim 12, wherein:
determining the transition paths comprises identifying all possible transition paths between a pair of program points; and
the possible transition paths further comprise:
transition paths that originate at the start of the Background job and end at a Sleep operation
transition paths that originate at the Sleep operation and end at the Wakeup operation; and
transition paths that originate at the Wakeup operation and end at the start of the Background job.

16. The computer readable medium of claim 12, wherein the information relating to a path entity on transition paths comprises:
a program statement of the path entity;
a location of the path entity in the program code, wherein the location of a path entity comprises a name of an input file and a line number in the program code;

a type of path entity, wherein the type of the path entity may be at least one of a conditional statement or a function call point;

an actual IPS computed at the program statement of the path entity.

17. The computer readable medium of claim 12, wherein the review information comprises:

a review judgment of IPS at the Sleep operation, wherein the review judgment is evaluated by comparing the user's expected IPS value at the Sleep operation and the actual IPS value for each set of program points;

the TLS computed at the program statement of the path entity;

a review judgment pertaining to risk of shared variables being overwritten by Interrupt service routines (ISRs);

the shared variables and the ISRs;

review judgment pertaining to risk of shared variables being overwritten by parallel tasks; and the shared variables and the parallel tasks.

* * * * *